United States Patent Office 3,006,742
Patented Oct. 31, 1961

3,006,742
FUEL COMPOSITIONS
Jerome E. Brown, Detroit, Mich., and Hymin Shapiro, East Baton Rouge, and Earl G. De Witt, Baton Rouge, La., assignors to Ethyl Corporation, New York, N.Y., a corporation of Delaware
No Drawing. Filed Oct. 29, 1958, Ser. No. 770,290
9 Claims. (Cl. 44—69)

This invention relates to improved fuel compositions and more particularly to improved fuels and additive fluids for use in the operation of a spark ignition internal combustion engine.

But for a few noteworthy substances, such as tetraethyllead and iron carbonyl, the state of the art has not advanced sufficiently to permit the preparation and isolation of "tailor-made" organometallic substances having the necessary characteristics of stability, volatility, and solubility. It is evident, therefore, that the state of the art will be greatly enhanced by providing a class of organometallic compounds capable of being modified to meet the requirements of fuel and oil additives.

It is an object of this invention to provide improved fuels for spark ignition internal combustion engines. Another object is to provide an improved fuel containing a particular class of organometallic compounds as additives. A further object is to provide fluids for addition to fuels to improve the combustion characteristics thereof. Another object is to provide fuel compositions which give improved operating characteristics with a minimum of engine wear.

In our prior co-pending application, Serial No. 698,905, filed November 26, 1957, of which the present application is a continuation-in-part, we have described and claimed a new class of fuel and fuel additive compositions containing metallic cyclomatic compounds. The class of compounds of our co-pending application, Serial No. 698,905, is therein defined as having the general formula $MA_xB_yC_z$ wherein M is a metal of groups VII, IB and IIB of the periodic table; A is a cyclomatic hydrocarbon radical; and each of B and C can be the same or different and is an electron donating group different from a cyclomatic radical, such that $a_n$ plus $5x$ plus $py$ plus $qz$ equals S, wherein S is the atomic number of an inert gas of the $n$th period, $x$ is a small whole integer from 1 to 2 inclusive, $y$ is a small whole integer from 1 to 4 inclusive, $z$ is a small whole integer from 0 to 4 inclusive, $n$ is a period of the periodic table and is 4, 5 or 6, $p$ and $q$ are the number of electrons donated by B and C respectively, and $a_n$ is the atomic number of M and is defined such that $a_n$ is within the parameters $(S_n-10)$ and $(S_n-6)$. Our above co-pending application, Serial No. 698,905, is in turn a continuation-in-part of application, Serial No. 325,224, filed December 10, 1952, now U.S. Patent 2,818,416, granted December 31, 1957.

Reference to the above generic formula indicates that there are three primary constituents of these compositions of matter. These are the metallic constituent designated as M, the cyclomatic hydrocarbon radical designated as A, and a different electron donating group designated as B. In certain embodiments of these novel cyclomatic compounds, there are two different electron donating groups, B and C.

The present invention is directed to the use of certain of the compounds of our aforementioned prior applications as additives for fuels used in present-day spark-fired internal combustion engines. These particular compounds constitute compositions of the above general formula wherein the metallic constituent M is a metal of groups VIII, IB and IIB of the periodic table, i.e., those metals having atomic numbers of from 26 to 30, 44 to 48 and 76 to 80 all inclusive and is within the parameters $(S_n-10)$ and $(S_n-6)$, $n$ being 4, 5 or 6. (The periodic table referred to is that appearing on pages 392 and 393 of the Handbook of Chemistry and Physics, 37th edition, published by the Chemical Rubber Publishing Company, Cleveland, Ohio, 1955.) Thus, the first primary constituent of the cyclopentadienyl coordination compounds employed in this invention, that is the metal constituent, is a metal selected from, in group VIII, iron, cobalt, nickel, ruthenium, rhodium, palladium, osmium, iridium and platinum; in group IB, copper, silver and gold, and in group IIB, zinc, cadmium and mercury. A preferred class of metallic constituents comprises those metals in the fourth period of the periodic table, i.e., iron, cobalt, copper, nickel and zinc. The iron and copper compounds are particularly preferred as their use leads to fuel compositions of superior antiknock quality whereas the nickel, cobalt, copper and zinc compounds are particularly preferred because they not only provide fuels of high antiknock activity, but do so with a minimum of engine wear. As will be seen below, an outstanding part of this invention is the use of cyclopentadienyl nickel coordination compounds together with organolead compounds as gasoline antiknocks. These particular combinations give tremendously powerful antiknock effects when these ingredients are combined in the specific proportions and ratios as hereinafter defined.

The second primary constituent of the new composition of matter of the present invention designated by the symbol A in the formula presented hereinbefore comprises a cyclomatic radical, that is, a cyclopentadiene-type hydrocarbon radical which is a radical containing the cyclopentadienyl moiety. In general, such cyclomatic hydrocarbon groups can be represented by the formulae:

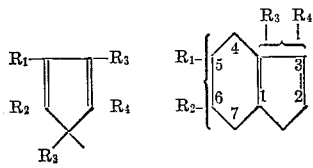

where the R's are selected from the group consisting of hydrogen and univalent organic hydrocarbon radicals.

A preferred class of cyclomatic radicals suitable in the practice of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. The compounds which yield these radicals are preferred as they are the more readily available cyclomatic compounds and the metallic cyclomatic coordination compounds obtainable from them have the more desirable characteristics of volatility and solubility which are prerequisites of superior hydrocarbon additives.

The third primary constituent of the compounds used in the present invention is designated as an electron donating group other than a cyclopentadienyl containing radical. Such groups are represented by the symbols B and C of the aforementioned generic formula. Each such electron donating group present in the compounds of this invention is an entity which is capable of sharing electrons with a metal atom so that the metal atom achieves a rare gas structure by virtue of the added electrons of the electron donating groups and the cyclopentadienyl group. These electron donating groups are either radicals or molecular species which contain labile electrons, that is, electrons capable of entering into covalent or coordinate covalent bonding, which electrons assume more stable configuration in the molecule when associated with a metal to give the metal the configuration of the next heavier rare gas in the outer shell thereof. In short, the metal is in the state of maximum covalency. Hydrogen and the methyl radical serve as examples of entities which donate a single electron, while carbon monoxide and ammonia are illustrative of two electron donors. Nitric oxide (NO) is a three electron donor. For the sake of clarity, electron donating groups applicable to the compounds of this invention are described by combining these groups according to the number of electrons which they are capable of donating as shown in Table I.

TABLE I.—ELECTRON DONATING GROUPS

| Number of electrons donated: | Donating group |
| --- | --- |
| 1 | H; CN; R. |
| 2 | CO; $NH_3$; $NR_3$; $PX_3$; $NX_3$. |
| 3 | NO. |
| 4 | Conjugated diolefins. |

R in Table I represents a univalent hydrocarbon radical, such as an alkyl, aryl, aralkyl and alkaryl radical. Such univalent hydrocarbon radicals are exemplified by methyl; ethyl; propyl; isobutyl; 2,2-dimethylpropyl; nonyl; tetradecyl; hexadecyl; propenyl; 2-pentenyl; phenyl and alkyl- and aryl-substituted phenyl radicals, such as 2,5-diethylphenyl; 2-phenylethyl and other aryl-substituted alkyl radicals, such as naphthylbutyl, cyclohexyl, methylcyclohexyl, and the like. Those having up to about 12 carbon atoms are preferred as they are the most readily available and their employment leads to more easily purified products. X in Table I represents a halogen, i.e., fluorine, chlorine, bromine or iodine.

An embodiment of the present invention comprises a liquid hydrocarbon fuel for spark ignition internal combustion engines containing from about 0.05 to about 10 grams per gallon of a metal selected from groups VIII, IB and IIB of the periodic table as a cyclopentadienyl metal coordination compound having the formula $MAB_yC_z$ where M, A, B and C are as defined above, $y$ is an integer from 1–4 inclusive and $z$ ranges from 0–2 inclusive. It is found that when such compositions are employed in the operation of a spark ignition internal combustion engine, antiknock and antiwear advantages are achieved which are impossible in compositions which do not contain the cyclopentadienyl metal coordination compound.

A preferred composition of the present invention comprises a composition containing from 1.0 to about 6.0 grams of metal per gallon of fuel as a cyclopentadienyl metal coordination compound as defined above. This range of metal concentration is preferred as it is found that superior fuels result from its employment.

A particular advantage of the additives of the present invention is the fact that by proper selection of the individual coordinating groups, compounds having "tailor-made" characteristics can be obtained. Thus, by the proper selection of the cyclomatic group, it is possible to prepare compounds possessing differing degrees of stability, volatility and solubility. Likewise, the selection of these constituents also enables the preparation of compounds of applicability in diverse fuels.

Another preferred class of compositions of the present invention comprises fuels containing group VIII and IB metals of the fourth period of the periodic table as a cyclopentadienyl coordination compound as defined above wherein the metal is coordinated to carbonyl groups. Thus, such compounds as cyclopentadienyl copper carbonyl, ethylcyclopentadienyl cobalt dicarbonyl, methylcyclopentadienyl methyl nickel carbonyl and cyclopentadienyl ethyl iron dicarbonyl are of particular advantage in the compositions of this invention due to the fact that the carbonyl group appears to provide compounds of proper stability which have the desired ancillary characteristics for use as fuel additives.

In providing fuel compositions of this invention, superior results are often obtained by including in the fuel mixtures of compounds. Thus, fuels having superior antiknock and antiwear characteristics are obtained when a mixture of cyclopentadienyl iron and zinc compounds, as defined above, are included therein. Other beneficial cyclopentadienyl metal compound mixtures include mixtures of iron and nickel compounds, nickel and copper compounds and zinc and cobalt compounds.

The base fuels employed to prepare the compositions of this invention have a wide variation of composition. These fuels generally are petroleum hydrocarbons and are usually blends of two or more components containing a mixture of many individual hydrocarbon compounds. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbon, including thermally cracked, catalytically cracked, reformed fractions, etc. When used for spark-fired engines, the boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F. with certain fractions of the fuel boiling away at particular intermediate temperatures.

These fuels often contain minor quantities of various impurities. One such impurity is sulfur, which can be present either in a combined form as an organic or inorganic compound, or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

To demonstrate the effectiveness of hydrocarbon fuels blended with cyclopentadienyl metal coordination compounds according to this invention, tests were made on fuels to which no antiknock agent was added and fuels which were blended in accordance with this invention. These tests were conducted according to the Research Method. The Research Method of determining octane number of a fuel is generally accepted as a method of test which gives a good indication of fuel behavior in full-scale automotive engines under normal driving conditions and is the method most used by commercial installations in determining the value of a gasoline additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D908–55 contained in the 1946 edition of "ASTM Manual of Engine Test Methods for Rating Fuels." The fuel employed in these tests was a synthetic mixture which is representative of commercial gasolines in present production and was used since it gives a standard antiknock response and predictable reproducibility. This mixture consists of 20 volume percent diisobutylene, 20 volume percent toluene, 20 volume percent isooctane and 40 volume percent n-heptane. When this fuel contained no antiknock additive, it had a research octain number of 91.3. Table II below shows the octane number achieved with the addition of various amounts of the additive compounds employed in this invention. These data indicate that substantial gains in octane number are provided by the compounds used in the practice of this invention.

TABLE II

| Additive | Grams of Metal/Gal. | Octane Number |
|---|---|---|
| $C_5H_5Co(CO)_2$ | 2.0 | 93.0 |
| $C_5H_5Fe(CO)_2CH_3$ | 1.0 | 93.7 |
|  | 2.0 | 96.3 |
| $C_5H_5NiNO$ | 1.0 | 93.8 |
|  | 2.0 | 95.0 |
| No additive |  | 91.2 |

In addition to the above tests, tests were conducted on the fuel which contained 3 milliliters of tetraethyllead per gallon. In a fuel thus blended the addition of 1 gram of nickel as cyclopentadienyl nickel nitrosyl gave an increase of 3.4 octane numbers over that obtainable with the tetraethyllead alone. This increase represents an outstanding improvement in antiknock effectiveness. For example, when one gram of iron as iron carbonyl is added to this same fuel, an increase of only 2.1 octane numbers is obtained.

Another advantage which the additives of this invention possess is their ability, when properly blended, to reduce the wear characteristics ordinarily encountered in the use of metallic antiknock agents. This is particularly true when cyclopentadienyl nickel, zinc and copper compounds are blended with the fuel according to this invention. By the use of these compounds the wear ordinarily associated with metallic antiknocks and particularly iron-containing compounds is considerably elevated. The amount of wear can be determined by the rate of loss of weight by the upper piston ring according to the method disclosed in U.S. Patent 2,315,845. The method of this patent involves determining wear by incorporating a radioactive substance in the surface of the piston ring normally subjected to abrasive wear then abrading the surface in the presence of the lubricating oil which is capable of receiving abraded particles and then determining the radioactivity of the lubricating oil. Thus, the wear is determined after operation of the engine containing the radioactive piston rings. It is found that when compositions of this invention containing cyclopentadienyl zinc, copper and nickel compounds are employed, considerably less wear is evidenced than when other metallic antiknocks are used in the absence of these compounds.

The cyclopentadienyl metal coordination compounds employed in this invention can be added directly to the hydrocarbon fuel and the mixture subjected to stirring, mixing or other means of agitation until a homogeneous fluid results. In addition to the cyclopentadienyl metal coordination compound, the fuel may have added thereto antioxidants, metal deactivators, halohydrocarbon scavengers, phosphorus compounds, dyes, anti-rust and anti-icing agent, supplementary wear inhibitors, and the like. The following examples are illustrative of the improved fuels of this invention and methods of preparing them.

*Example I*

To a synthetic fuel consisting of 20 volume percent toluene, 20 volume percent isobutylene, 20 volume percent isooctane and 40 volume percent n-heptane is added cyclopentadienyl methyl iron dicarbonyl, $C_5H_5Fe(CO)_2CH_3$, in amount such that the iron concentration is 0.05 gram per gallon. The mixture is agitated until a homogeneous blend of the cyclopentadienyl iron compound in the fuel is achieved. This fuel has substantially increased octane value.

*Example II*

To 1000 gallons of commercial gasoline having a gravity of 59.0° API, an initial boiling point of 98° F. and a final boiling point of 390° F. which contains 46.2 volume percent paraffins, 28.4 volume percent olefins and 25.4 volume percent aromatics is added 10.0 grams per gallon of nickel as methylcyclopentadienyl nickel nitrosyl to give a fuel of enhanced octane quality.

*Example III*

Phenylcyclopentadienyl cobalt dicarbonyl is added in amount sufficient to give a cobalt concentration of 6.0 grams per gallon to a gasoline having an initial boiling point of 93° F., a final boiling point of 378° F. and an API gravity of 56.2°.

*Example IV*

To a liquid hydrocarbon fuel containing 49.9 volume percent paraffins, 15.9 volume percent olefins and 34.2 volume percent aromatics and which has an API gravity of 51.5°, an initial boiling point of 11° F. and a final boiling point of 394° F. is added cyclopentadienyl copper carbonyl to a copper concentration of 3.0 grams per gallon.

*Example V*

To the base fuel of Example II is added cyclopentadienyl zinc phenyl in amount such that the zinc concentration is 2.0 grams per gallon.

*Example VI*

To a gasoline having an initial boiling point of 81° F. and a final boiling point of 410° F. is added a mixture of octylcyclopentadienyl iron nitrosyl carbonyl and methylcyclopentadienyl zinc ethyl such that the iron concentration is 1.25 grams per gallon and the zinc concentration is 0.5 gram per gallon. This fuel is found to have excellent antiknock characteristics while imparting a minimum of wear to the engine in which it is employed.

*Example VII*

Cyclopentadienyl copper phosphorus trichloride and cyclopentadienyl phenyl nickel carbonyl are added to an aviation gasoline having a final boiling point of 338° F. and a 50 percent evaporation temperature of 221° F. The compounds are added such that the finished fuel contains per gallon 2 grams of nickel and 2 grams of copper.

*Example VIII*

To the base fuel of Example III is added cyclopentadienyl propyl ruthenium diammonia and tert-butyl cyclopentadienyl methyl cadmium in amount such that the ruthenium concentration is 1.0 gram per gallon and the cadmium is 3.0 grams per gallon.

A further embodiment of the present invention comprises a liquid hydrocarbon fuel for use in spark ignition internal combustion engines containing a cyclopentadienyl metal coordination compound as defined above wherein the metal atom achieves the electron configuration of the next higher rare gas and an organolead antiknock agent. In this embodiment of the invention, it is often desirable to employ conventional halohydrocarbon scavengers or corrective agents, such as are conventionally used with organolead antiknock agents. When an organolead antiknock agent is employed, it may be present in the fuel in concentrations up to about 8 grams of lead per gallon. In the case of aviation fuels up to 6.34 grams of lead may be employed.

An especially preferred embodiment of this invention is the use in conjunction with organolead antiknocks of specific amounts of certain of the compounds disclosed in our aforementioned prior applications as additives for gasoline and related hydrocarbon-type fuels. These particular compounds constitute compositions of the above general formula wherein the metallic constitutent M is nickel.

One aspect of this embodiment of the present invention comprises a liquid hydrocarbon fuel of the gasoline boiling range containing from about 0.5 to about 6.34 grams of lead per gallon as an organolead antiknock agent and from about 0.005 to about 1 gram of nickel per gallon as a cyclopentadienyl nickel coordination compound having the formula $MAB_yC_z$ where M, A, B and C are as defined above, $y$ is an integer from 1–3 inclusive and $z$ ranges from 0–2 inclusive.

Another preferred aspect of the present invention comprises a composition as defined in the previous paragraph in which the nickel concentration ranges from about 0.01 to about 0.5, and most preferably from about 0.01 to about 0.3 gram of nickel per gallon. These ranges of metal concentration are preferred as it has been found that especially superior fuels—particularly from the cost-effectiveness standpoint—result from their employment.

A most preferred aspect of the present invention comprises leaded fuels containing a cyclopentadienyl nickel nitrosyl, i.e., a cyclopentadienyl coordination compound as defined above wherein the nickel is coordinated to one nitrosyl group as well as to the cyclopentadienyl group. Thus, such compounds as cyclopentadienyl nickel nitrosyl, methylcyclopentadienyl nickel nitrosyl, ethylcyclopentadienyl nickel nitrosyl and dimethylcyclopentadienyl nickel nitrosyl are of particular advantage in the compositions of this invention due to the fact that the cyclopentadienyl nickel nitrosyls as a class are highly soluble in gasoline and, because of their ideal volatility properties, are very smoothly inducted into the engine.

To demonstrate the effectiveness of the especially preferred compositions of this invention, additional tests were conducted according to the Research Method. The fuel employed in these tests was a synthetic mixture which is representative of commercial gasolines in present production and was used since it gives a standard antiknock response and predictable reproducibility. This mixture consists of 20 volume percent diisobutylene, 40 volume percent toluene, 10 volume percent isooctane and 30 volume percent n-heptane. When this fuel contained 3 milliliters per gallon of tetraethyllead, it had a research octane number of 97.0.

In this series of tests comparisons were made of the octane improving properties of cyclopentadienyl nickel nitrosyl and of nickel carbonyl when added to the above leaded fuel. Cyclopentadienyl nickel nitrosyl is an especially preferred additive of this invention, whereas nickel carbonyl is a compound which has long been known in the prior art to have antiknock properties.

Table III below shows the octane number improvement achieved with the addition of even an infinitesimally small concentration of nickel as cyclopentadienyl nickel nitrosyl. The corresponding data for prior art nickel carbonyl compositions are also shown in this table. These data prove that unpredictably great gains in octane number are provided by the especially preferred compounds used in the practice of this invention.

TABLE III.—EFFECT OF NICKEL COMPOUNDS ON ANTIKNOCK QUALITY

| Nickel Additive | Nickel Conc., g./gal. | Increase in Octane Number Caused by Addition of Nickel |
|---|---|---|
| Present Invention: | | |
| Cyclopentadienyl nickel nitrosyl | 0.05 | 1.8 |
| Prior Art: | | |
| Nickel Carbonyl | 0.1 | None |
| Do | 1.0 | 0.8 |

It is seen from the above data that the presence of only 0.05 gram of nickel in the form of an additive of this invention caused a tremendous improvement in octane quality of the leaded fuel. In sharp contrast, twice this concentration of nickel as nickel carbonyl failed to produce any detectable octane number improvement. Furthermore, twenty times as much nickel as nickel carbonyl failed to produce anywhere near as great an improvement in octane quality as that achieved with the composition of this invention. It is seen, therefore, that cyclopentadienyl nickel nitrosyl was well over forty times as effective as nickel carbonyl on a weight of metal basis.

It is also interesting to note that an additional 1.1 grams of lead per gallon as tetraethyllead must be used in the above fuel (when devoid of nickel) to get the same octane increase as that given by a mere 0.05 gram of nickel per gallon as our nitrosyl compound. Thus, nickel as cyclopentadienyl nickel nitrosyl was shown in these tests to be over 2000 percent as effective as additional lead as tetraethyllead in improving the octane quality of the test fuel. This still further establishes the exceptional potency of the nickel additives of this invention when employed in the manner described above.

The spectacular effectiveness of the especially preferred compositions of this invention from the antiknock standpoint was still further established by a series of tests using commercial premium motor fuel base stocks. Four commercial fuels (hereafter A, B, C and D) were each leaded to about 3 milliliters of tetraethyllead per gallon. For this purpose, 62-Mix (tetraethyllead, 0.5 theory of ethylene dibromide and 1.0 theory of ethylene dichloride) was used. Each was then rated by the Research Method to determine the base octane quality. Then, individual portions of these fuels were treated with varying concentrations of nickel as cyclopentadienyl nickel nitrosyl. The resultant fuels of this invention were subjected to the Research Method and the vast increases in octane number caused by the co-presence of the nickel thereby determined. The data are in Table IV.

TABLE IV.—ANTIKNOCK IMPROVEMENT OF COMMERCIAL PREMIUM MOTOR FUEL BASE STOCKS

| Fuel | TEL Conc., g. Pb/gal. | Nickel Conc., g./gal. | Octane Number | Increase in Octane Number Caused By Nickel Compound |
|---|---|---|---|---|
| A | 3.17 | None | 99.1 | |
| A | 3.17 | 0.05 | 100.0 | 0.9 |
| A | 3.17 | 1.0 | 101.3 | 2.2 |
| B | 3.30 | None | 96.4 | |
| B | 3.30 | 0.05 | 97.0 | 0.6 |
| B | 3.30 | 0.2 | 97.2 | 0.8 |
| B | 3.30 | 0.5 | 97.6 | 1.2 |
| C | 3.24 | None | 98.4 | |
| C | 3.24 | 0.05 | 99.2 | 0.8 |
| C | 3.24 | 0.1 | 99.4 | 1.0 |
| D | 3.20 | None | 94.0 | |
| D | 3.20 | 0.5 | 94.9 | 0.9 |
| D | 3.20 | 1.0 | 95.6 | 1.6 |

It is seen that striking improvements in octane quality were achieved in each of the above fuels of this invention even though the concentrations of nickel were extremely small. In fact, these profound octane number increases resulted from the use of nickel concentrations that were only small fractions of the lead concentrations. Furthermore, these striking improvements occurred in modern, high octane gasolines in which such octane increases are normally exceedingly difficult and costly to obtain.

The following examples illustrate the especially preferred embodiments of this invention and methods of preparing them.

*Example IX*

To a synthetic fuel consisting by volume of 20 percent toluene, 20 percent butylene, 20 percent isooctane and 40 percent n-heptane is added butylcyclopentadienyl nickel nitrosyl in amount such that the nickel concentration is 0.005 gram per gallon. To the resultant fuel is added 0.5 gram of lead per gallon as tetraethyllead. The mixture is agitated until a homogeneous blend is achieved. This fuel has substantially increased octane value.

Example X

To 1000 gallons of commercial gasoline having a gravity of 59.0° API, an initial boiling point of 98° F. and a final boiling point of 390° F. which contains 46.2 volume percent paraffins, 28.4 volume percent olefins, and 25.4 volume percent aromatics are added 1.0 gram per gallon of nickel as methylcyclopentadienyl nickel nitrosyl and 4.0 grams of lead per gallon as tetraethyllead to give a fuel of greatly enhanced octane quality.

Example XI

Phenylcyclopentadienyl methyl nickel carbonyl is added in amount sufficient to give a nickel concentration of 0.01 gram per gallon to a gasoline having an initial boiling point of 93° F., a final boiling point of 378° F., an API gravity of 56.2° and a tetraethyllead content equivalent to 2.0 grams of lead per gallon.

Example XII

To a liquid hydrocarbon fuel containing 49.9 volume percent paraffins, 15.9 volume percent olefins and 34.2 volume percent aromatics and which has an API gravity of 51.5°, an initial boiling point of 11° F. and a final boiling point of 394° F. are added methylisopropylcyclopentadienyl ethyl nickel phosphorus trichloride to a nickel concentration of 0.5 gram per gallon and tetramethyllead to a lead concentration of 1.0 gram per gallon.

Example XIII

To the base fuel of Example X are added octylcyclopentadienyl phenyl nickel ammonia and tetraphenyllead in amounts such that the nickel concentration is 0.05 gram per gallon and the lead concentration is 3.0 grams per gallon.

Example XIV

To a gasoline having an initial boiling point of 81° F. and a final boiling point of 410° F. is added a mixture of indenyl nickel nitrosyl and tetraoctyllead such that the nickel concentration is 0.3 gram per gallon and the lead concentration is 6.34 grams per gallon. This fuel is found to have excellent antiknock characteristics while imparting a minimum of wear to the engine in which it is employed.

Example XV

Cyclopentadienyl nickel carbonyl hydride and tetraethyllead are blended with aviation gasoline having a final boiling point of 338° F. and a 50 percent evaporation temperature of 210° F. The compounds are added such that the finished fuel contains per gallon 0.2 gram of nickel and 3.0 grams of lead.

Example XVI

To the base fuel of Example XII is added butyl triethyllead in amount such that the lead concentration is 0.5 gram per gallon. Next is added ethylcyclopentadienyl nickel nitrosyl in amount such that the nickel concentration is 0.75 gram per gallon. The resultant fuel is found to have excellent antiknock characteristics.

The organolead antiknock agents are ordinarily hydrocarbolead compounds including tetraphenyllead, dimethyldiphenyllead, tetrapropyllead, dimethyldiethyllead, tetramethyllead and the like. Tetraethyllead is preferred as it is most commonly available commercial antiknock agent. It is also convenient in the case where organolead antiknock agents are employed to premix into a fluid the cyclopentadienyl metal coordination compound, the organolead antiknock agent and supplementary agents, such as scavengers, antioxidants, dyes and solvents, which fluids are later added to the liquid hydrocarbon fuel to be improved. Thus, a further embodiment of this invention comprises a fluid for addition to liquid hydrocarbon fuels of the gasoline boiling range consisting essentially of an organolead antiknock agent, scavengers therefor and a cyclopentadienyl metal coordination compound as defined above. In general, when the cyclopentadienyl metal coordination compound employed in this invention is blended with organolead antiknock agents, the concentrations are adjusted so that from 0.01 to about 10 grams of metal as a cyclopentadienyl coordination compound are present in the composition for each gram of lead as an organolead antiknock agent. A preferred range comprises those compositions wherein the relative concentrations of metal are adjusted so that from about 0.1 to about 6 grams of metal as a cyclopentadienyl metal coordination compound are present for each gram of lead as an organolead compound.

Another preferred embodiment of this invention comprises a fluid for addition to liquid hydrocarbon fuels of the gasoline boiling range consisting essentially of an organolead antiknock agent, an organic halide scavenger therefor and a cyclopentadienyl nickel coordination compound as defined above. In general, the cyclopentadienyl nickel coordination compounds employed in this embodiment are blended with organolead antiknock agents in concentrations such that from about 0.0008 to about 2 grams of nickel as a cyclopentadienyl coordination compound are present in the composition for each gram of lead as an organolead antiknock agent. A preferred range comprises those compositions wherein the relative concentrations of metal are adjusted so that from about 0.0016 to about 1 gram of nickel as a cyclopentadienyl nickel coordination compound is present for each gram of lead as an organolead compound.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide, as for example, lead dihalide. In other words, a theory of halogen represents two atoms of halogen for every atom of lead present. In like manner, a theory of phosphorus is the amount of phosphorus required to convert the lead present to lead orthophosphate, $Pb_3(PO_4)_2$, that is, a theory of phosphorus represents two atoms of phosphorus for every three atoms of lead. One theory of arsenic, antimony and bismuth is defined in the same general way. That is, one theory thereof is two atoms of the element per each three atoms of lead.

The halohydrocarbon scavengers which can be employed in the compositions of this invention can be either aliphatic or aromatic halohydrocarbons or a combination of the two having halogen attached to carbon in either the aliphatic or aromatic portion of the molecule. The scavengers may also be carbon, hydrogen and oxygen containing compounds, such as haloalkyl ethers, halohydrins, halo ethers, halonitro compounds, and the like. Still other examples of scavengers that may be used in the fuels of this invention are illustrated in U.S. Patents 1,592,954; 1,668,022; 2,398,281; 2,479,900; 2,479,- 901; 2,479,902; 2,479,903; 2,496,983; 2,661,379; 2,822,- 252; 2,849,302; 2,849,303; and 2,849,304. Mixtures of different scavengers may also be used and other scavengers and modifying agents, such as phosphorus compounds, may also be included. Concentrations of organic halide scavengers ranging from about 0.5 to about 2.5 theories based on the lead are usually sufficient, although greater or lesser amounts may be used. See, for example, the description of scavenger concentrations and proportions given in U.S. Patent 2,398,281. Such concentrations and proportions can be successfully used in the practice of this invention.

When used in the compositions of this invention, phosphorus, arsenic, antimony and bismuth compounds have the property of altering engine deposit characteristics in several helpful ways. Thus, benefits are achieved by including in the compositions of this invention one or more gasoline-soluble organic compounds of the elements of group VA of the periodic table, which elements have atomic numbers of 15 through 83. The periodic table to which reference is made is found in Lange's Handbook of Chemistry, 7th edition, pages 58–59. One effect of these group VA compounds is to alter the deposits so that in the case of spark plugs the resulting deposits are less conductive. Thus, imparted to the spark plug is greater resistance to fouling. In the case of combustion chamber surface deposits the group VA element renders these deposits less catalytic with respect to hydrocarbon oxidation and thus reduces surface ignition. In addition, these group VA elements in some way inhibit deposit build up on combustion chamber surfaces, notably exhaust valves. This beneficial effect insures excellent engine durability. In particular, excellent exhaust valve life is assured. Of these group VA elements the use of gasoline-soluble phosphorus compounds is preferred from the cost-effectiveness standpoint. Applicable phosphorus additives include the general organic phosphorus compounds, such as derivatives of phosphoric and phosphorous acids. Representative examples of these compounds include trimethylphosphate, trimethylphosphite, phenyldimethylphosphate, triphenylphosphate, tricresylphosphate, tri-β-chloropropyl thionophosphate, tributoxyethylphosphate, xylyl dimethylphosphate, and other alkyl, aryl, aralkyl, alkaryl and cycloalkyl analogues and homologues of these compounds. Phenyldimethylphosphates in which the phenyl group is substituted with up to three methyl radicals are particularly preferred because they exhibit essentially no antagonistic effects upon octane quality during engine combustion. Other suitable phosphorus compounds are exemplified by dixylyl phosphoramidate, tributylphosphine, triphenylphosphine oxide, tricresyl thiophosphate, cresyldiphenyl phosphate, and the like. Gasoline-soluble compounds of arsenic, antimony and bismuth corresponding to the above phosphorus compounds are likewise useful in this respect. Thus, use can be made of various alkyl, cycloalkyl, aralkyl, aryl and/or alkaryl, arsenates, arsenites, antimonates, antimonites, bismuthates, bismuthites, etc. Tricresyl arsenite, tricumenyl arsenate, trioctyl antimonate, triethyl antimonite, diethylphenyl bismuthate and the like serve as examples. Other very useful arsenic, antimony and bismuth compounds include methyl arsine, trimethyl arsine, triethyl arsine, triphenyl arsine, arseno benzene, triisopropyl bismuthine, tripentyl stibine, tricresyl stibine, trixylyl bismuthine, tricyclohexyl bismuthine and phenyl dicresyl bismuthine. From the gasoline solubility and engine inductibility standpoints, organic compounds of these group VA elements having up to about 30 carbon atoms in the molecule are preferable. Concentrations of these group VA compounds ranging from about 0.05 to about 1 theory based on the lead normally suffice. In other words, the foregoing technical benefits are achieved when the atom ratio of group VA element-to-lead ranges from about 0.1:3 to about 2:3.

Other especially preferred combinations of this invention comprise motor fuels containing from about 1.5 to about 4.3 grams of lead per gallon as an alkyllead antiknock agent, from about 0.05 to about 0.5 gram of nickel per gallon as a cyclopentadienyl nickel nitrosyl and from about 0.1 to about 0.5 theory based on the lead of a gasoline-soluble organic compound of a group VA element of atomic number 15 through 83. In these compositions the atom ratio of group VA element-to-lead is thus from about 0.2:3 to about 1:3. These especially preferred compositions possess all of the foregoing technical features—exceedingly high antiknock quality, low engine wear, exceptionally good engine durability, etc.—to a very marked degree. Furthermore, these technical improvements are achieved at a minimum of cost.

The following examples are illustrative of fuels and fluids containing organolead compounds in combination with various cyclopentadienyl metal coordination compounds.

Example XVII

To 1000 gallons of a gasoline containing 46.2 percent paraffins, 28.4 percent olefins and 25.4 percent aromatics which has a final boiling point of 390° F. and an API gravity of 59.0° and which contains 3 milliliters of tetraethyllead as 62-Mix (1 theory of ethylene dichloride and 0.5 theory of ethylene dibromide) is added sufficient cyclopentadienyl cobalt dicarbonyl to give a cobalt concentration of 6 grams per gallon.

Example XVIII

To a typical aviation fuel having an API gravity of 64.4 and an end boiling point of 335° F. and which contains 8.0 grams of tetraethyllead and 1 theory of dibromobutane is added a mixture of cyclopentadienyl dimethyl iron nitrosyl and benzyl cyclopentadienyl tricyano nickel in amounts such that 2 grams of iron and 1 gram of nickel are present in the finished fuel.

Example XIX

A fluid for addition to gasoline is prepared by admixing tetraethyllead and ethylcyclopentadienyl copper phosphorus tribromide in amount such that for each 8 grams of lead there is 1 gram of copper in the final mixture. This composition is then added to the base fuel of Example VI in amount such that 1, 3, 6 and 10 grams of copper respectively are present in the fuel batches. Good results are also obtained when from 0.02 to 0.5 theory of phosphorus based on lead are added to these compositions as trimethylphosphate.

Example XX

To the compositions of Example XIX is added ethylene dibromide in amount such that there is one theory of scavenger present based on the amount of tetraethyllead.

Example XXI

Tetraphenyllead, ethylcyclopentadienyl methyl zinc and cyclopentadienyl ruthenium dimethylamine nitrosyl are admixed in amount such that the metals are present in ratios of 1 gram of lead to 3 grams of ruthenium to 7 grams of zinc. This composition is then added to the base fuel blend of Example IX in amounts sufficient to give lead concentrations of 1, 3, 6 and 8 grams of lead per gallon in individual batches of the fuel.

Example XXII

To the compositions of Example XXI is added a 2:1 mole mixture of ethylene dichloride and ethylene dibromide such that a total scavenger of 1.5 theories based on lead is present. Furthermore, the advantages of this invention are also achieved when 0.02 theory of phosphorus based on total metal present is added in the form of diphenylmethyl phosphate.

The following examples are illustrative of fuels and fluids comprising organolead compounds in combination with the cyclopentadienyl nickel coordination compounds and one or more auxiliary additives.

Example XXIII

To 1000 gallons of a gasoline containing 46.2 percent paraffins, 28.4 percent olefins and 25.4 percent aromatics which has a final boiling point of 390° F. and an API gravity of 59.0° and which contains 3 milliliters of tetraethyllead per gallon (3.18 grams of lead per gallon) as 62-Mix is added sufficient cyclopentadienyl nickel nitrosyl to give a nickel concentration of 0.25 gram per gallon.

Example XXIV

To 1000 gallons of a typical aviation fuel having an API gravity of 64.4° and an end boiling point of 335° F. and which contains 4.6 milliliters of tetraethyllead per gallon and 1 theory of bromine as dibromotoluene (mixed isomers) is added benzylcyclopentadienyl tricyano nickel in amount such that 1 gram of nickel per gallon is present in the resultant fuel. This fuel is then divided into four equal portions (250 gallons each). To one portion is added 0.1 theory of phosphorus as tricresylphosphate. To another is added 0.5 theory of arsenic as trixylyl arsine. The remaining portions are treated respectively with 0.05 theory of antimony as triphenyl stibine, and 1 theory of bismuth as tributyl bismuthine.

Example XXV

A fluid for addition to gasoline is prepared by admixing tetraethyllead and methylcyclopentadienyl nickel nitrosyl in amount such that for each gram of lead there is 0.05 gram of nickel in the mixture. This mixture is then combined with 2,3-dibromobutane and ethylene dichloride in amounts such that the final mixture contains 0.45 theory of bromine and 1.0 theory of chlorine based on the lead. Portions of this antiknock fluid composition are then added to five individual batches of the base fuel of Example VI in amounts such that 0.5, 1.5, 3, 4 and and 6.3 grams of lead per gallon respectively are present in the fuel batches. Excellent durability results are insured when from 0.1 to 0.5 theory of phosphorus based on the lead are added to these compositions as trimethylphosphate.

Example XXVI

With the finished fuel of Example IX is blended 0.4 theory of phosphorus as dimethylxylyl phosphate base on the amount of tetraethyllead.

Example XXVII

Tetratolyllead, methylcyclopentadienyl methyl nickel carbonyl and 1,2,4-trichlorobenzene are admixed in amounts such that the metals are present in the ratio of two grams of nickel per gram of lead and there are two theories of chlorine present based on the lead. This antiknock fluid is divided into four equal parts. With the first is blended tri-(β-chloroisopropyl) thionophosphate in amount equivalent to 0.4 theory of phosphorus based on the lead. An amount of triphenyl arsine is blended with another portion so that it contains 0.3 theory of arsenic based on the lead. The third portion is treated with triethyl antimonite so that it contains 0.4 theory of antimony based on the lead. The final portion is admixed with triphenyl bismuthine to a concentration of 0.3 theory of bismuth based on the lead. Each resultant antiknock fluid composition is then added to separate batches of the base fuel of Example IX in amounts sufficient to give nickel concentrations of 1 gram per gallon.

Example XXVIII

There is first prepared in one instance an initial lead-nickel mixture composed of methyltriethyllead and cyclopentadienyl ethyl nickel carbonyl $$[(C_5H_5)Ni(CO)(C_2H_5)]$$

in a ratio of 0.0008 gram of nickel per gram of lead; and in another instance an initial lead-nickel mixture composed of dimethyldiethyllead and cyclopentadienyl phenyl nickel carbonyl in the ratio of 0.5 gram of nickel per gram of lead. This first mixture is then treated with 1 theory based on the lead of bromine as 1,4-dibromobutane and blended with the base fuel of Example VII to a lead concentration of 6.34 grams per gallon. The second mixture is treated with 0.3 theroy based on the lead of tri-(2-ethylhexyl) phosphate. This mixture is then blended into separate portions of the base fuel of Example VI to lead concentrations of 0.5, 1.0, 1.5 and 2.0 grams per gallon.

Example XXIX

With the base fuel of Example IX are blended tetraethyllead, dimethylcyclopentadienyl nickel nitrosyl and an equimolar mixture of phenyl dimethyl phosphate and methyl diphenyl phosphate. The amounts used correspond to 2.6 milliliters of tetraethyllead per gallon, 0.1 gram of nickel per gallon and 0.3 theory of phosphorus based on the lead.

In each of the preceding examples the cyclopentadienyl metal coordination compound additive possesses an inert gas structure in the outer electron shell of the metal atom. Since the metals occur in the fourth, fifth and sixth periods of the periodic table, the resulting cyclopentadienyl coordination compound has the electron configuration of the inert gas of that period, that is, krypton atomic number 36, xenon, atomic number 54 and radon, atomic number 86. Therefore, in the expression $A_n+5x+py+qz=S$, S becomes 36, 54 or 86. Since $A_n$ is within the parameters expressed by $(S_n-10)$ and $(S_n-6)$, that is, since the atomic number of the metal is from 26–30, 44–48 or 76–80 all inclusive, the atomic numbers of the metal can be substituted in the expression $A_n+5x+py+qz=S$. Since there is one cyclomatic radical in the compound x is equal to 1 and likewise where there is a single type of electron donor group y is equal to from 1–4 and z is equal to 0. Where there are two types of electron donor groups, z is equal to from 1–2. The electron donor groups donate the number of electrons as shown by the listing of donor groups in Table I above. Thus, for each compound in the examples, the expression $A_n+5x+py+qz=S$ has been completely satisfied. For example, cyclopentadienyl methyl iron dicarbonyl $C_5H_5Fe(CO)_2CH_3$, $26+5(1)+2(2)+1(1)=36$; cyclopentadienyl ethyl zinc $C_5H_5ZnC_2H_5$, $$30+5+(1)+1(1)+0=36$$

methylcyclopentadienyl nickel nitrosyl, $CH_3C_5H_5NiNO$, $28+5(1)+3(1)+0=36$; cyclopentadienyl ruthenium bis-dimethylamine nitrosyl $C_5H_5Ru[(CH_3)_2N]_2NO$, $$44+5(1)+2(2)+3(1)=54$$

The preceding examples are merely illustrative of the metallic cyclomatic coordination compounds used in the present invention. To more completely define the scope of the present invention, additional examples will be presented hereinafter. For convenience, these compounds are grouped according to the metallic atom present.

GROUP IB ELEMENTS $(C_5H_5)Cu(CO)$ _____ $29+5(1)+2(1)+0=36$
$(C_9H_7)Cu(PBr_3)$ _____ $29+5(1)+2(1)+0=36$
$(C_{13}H_9)Cu(NI_3)$ _____ $29+5(1)+2(1)+0=36$
$(C_5H_5)Cu(C_2H_5)(CH_3)$ ___ $29+5(1)+1(1)+1(1)=36$
$(C_5H_5)Ag(CH_3)(C_6H_5)$ ___ $47+5(1)+1(1)+1(1)=54$
$(C_{13}H_9)Au(NH_3)$ _____ $79+5(1)+2(1)+0=86$
$(C_5H_5)Au(C_3H_7)(H)$ _____ $79+5(1)+1(1)+1(1)=86$
$(C_9H_7)Au(H)_2$ _____ $79+5(1)+1(2)+0=86$
$(C_5H_5)Cu(H)_2$ _____ $29+5(1)+1(2)+0=36$

GROUP IIB ELEMENTS $(C_5H_5)Zn(C_2H_5)$ _____ $30+5(1)+1(1)+0=36$
$(C_6H_5)Zn(C_8H_5)$ _____ $30+5(1)+1(1)+0=36$
$(C_9H_7)Zn(H)$ _____ $30+5(1)+1(1)+0=36$
$(C_5H_5)Cd(CH_3)$ _____ $48+5(1)+1(1)+0=54$
$(C_{13}H_9)Cd(H)$ _____ $48+5(1)+1(1)+0=54$
$(C_5H_5)Hg(C_4H_9)$ _____ $80+5(1)+1(1)+0=86$
$(C_9H_7)Hg(C_6H_5)$ _____ $80+5(1)+1(1)+0=86$

GROUP VIII ELEMENTS $(C_5H_5)Fe(CO)_2H$ —————— 26+5(1)+2(2)+1(1)=36
$(C_5H_5)Ru(CO)(NO)$ —————— 44+5(1)+2(1)+3(1)=54
$(C_{13}H_9)Os(H)_5$ —————— 76+5(1)+1(5)+0=86
$(C_5H_5)Os(CH_3)_3(PI_3)$ —— 76+5(1)+1(3)+2(1)=86
$(C_5H_5)Co(CO)_2$ —————— 27+5(1)+2(2)+0=36
$(C_5H_5)Co(CO)(NH_3)$ —— 27+5(1)+2(1)=2(1)=36
$(C_5H_5)Rh(CHI_3)(PCl_3)$ —— 45+5(1)+2(1)+2(1)=54
$(C_{13}H_9)Ir(PI_3)_2$ —————— 77+5(1)+2(2)+0=86
$(C_5H_5)Ir(NO)(H)$ —————— 77+5(1)+3(1)+1(1)=86
$(C_5H_5)Ni(NO)$ —————— 28+5(1)+3(1)+0=36
$(C_5H_5)Ni(CO)(C_2H_5)$ —— 28+5(1)+2(1)+1(1)=36
$(C_9H_7)Pd(H)_3$ —————— 46+5(1)+1(3)+0=54
$(C_5H_5)Pd(CH_3)_2(H)$ —— 46+5(1)+1(2)+1(1)=54
$(C_5H_5)Pt(CH_3)_3$ —————— 78+5(1)+1(3)+0=86
$(C_{13}H_9)Pt(NO)$ —————— 78+5(1)+3(1)+0=86

In the above listing of illustrative examples of the novel cyclomatic compounds of the present invention, the cyclomatic radicals are shown by their empirical formulae. Thus, $C_5H_5$ represents a cyclopentadienyl radical, and $C_9H_7$ and $C_{13}H_9$ denote respectively an indenyl and fluorenyl radical. It is to be understood, however, that any of the general type of cyclomatic radicals described hereinbefore can be employed in the compounds constituting constituents of the fuels of the present invention.

The compounds of this invention are susceptible to preparation by a variety of methods and the following examples are intended to serve as illustrations of these methods as applied to the various compounds.

Example XXX

To a stirred reaction vessel containing a solution of 126.5 parts of ethyl bromide in 200 parts of diethyl ether was added 28.2 parts of magnesium metal. The mixture was stirred at a temperature of 25° C. until the reaction was essentially complete whereupon the unreacted magnesium was removed by filtration. A 55 percent aliquot of this filtered reaction product was added to a solution of 39.6 parts of cyclopentadiene in 100 parts of diethyl ether. The resulting mixture was allowed to stand at a temperature of 25° C. for sixteen hours whereupon this mixture was added to a solution of 68 parts of anhydrous zinc chloride dissolved in 200 parts of diethyl ether. At the end of an addition period of about one-half hour, a white slurry was obtained. To this mixture was added a 45 percent aliquot resulting from the reaction described hereinbefore between 126.5 parts of ethyl bromide dissolved in 200 parts of diethyl ether with 28.2 parts of magnesium. At the end of an addition period of one hour, the pressure of the reaction vessel was reduced thereby effecting a removal of most of the excess of diethyl ether. To the resulting mixture was added 200 parts of benzene and the reaction vessel was again maintained at reduced pressure thereby effecting an essentially quantitative removal of the remaining ether and the benzene. The reaction vessel was then connected to a cold condenser and the system maintained at a reduced pressure. A total of 27 parts of a white solid having a melting point of between 66 and 68° C. was recovered by sublimation amounting to a recovery of approximately 33 percent. By analysis, this material was shown to contain 52.56 percent carbon, 6.38 percent hydrogen, and 40.7 percent zinc while the formula $C_7H_{10}Zn$ requires 52.65 percent carbon, 6.32 percent hydrogen, and 41.0 percent zinc.

Example XXXI

To a pressure resistant vessel equipped with temperature measuring device, gas inlet and outlet means, agitation means, heating and cooling means, and means for adding reagents under pressure, is added 185 parts of methylcyclopentadienyl magnesium bromide and 450 parts of ether. The vessel and Grignard solution are cooled to about 40° C. and 130 parts of finely-powdered anhydrous cobaltous chloride is added. The vessel is flushed with nitrogen and then with carbon monoxide pressure between 1000 and 2000 p.s.i.g. When the vessel reaches 27° C., heat is applied to raise the contents to about 50° C. and the vessel is again allowed to cool. Constant agitation is maintained throughout the reaction period. Upon cooling to room temperature, the contents of the vessel are discharged and the methylcyclopentadienyl cobalt dicarbonyl is separated from the reaction mixture by fractional distillation at reduced pressure.

Cyclopentadienyl cobalt dicarbonyl is prepared in a similar manner, starting with cyclopentadienyl magnesium iodine. This compound is a dark-red liquid which bolts at about 75° C. at a reduced pressure of 22 millimeters of mercury.

Example XXXII

Under a nitrogen atmosphere, 0.29 mole of dicyclopentadienyl nickel was dissolved in 500 milliliters of petroleum ether boiling in the range of 38.5–50° C. Nitric oxide was bubbled into the dicyclopentadienyl nickel solution for 1.5 hours. After stirring for one hour, brown-green solids settled out leaving a dark-red solution which was filtered. The red filtrate was distilled in a helix packed column at atmospheric pressure to remove most of the petroleum ether. The remainder was removed under slightly reduced presure. Fractionation yielded 30 parts of cyclopentadienyl nickel nitrosyl representing 55.8 percent conversion based on the dicyclopentadienyl nickel. This stable, volatile, gasoline-soluble product is a deep-red liquid boiling at 56.5° C./22 mm.

*Analysis.*—Calc'd. for $C_5H_5NiNO$: Ni, 38.2. Found: Ni, 37.6.

Example XXXIII

A mixture of 980 parts of dicyclopentadiene and 210 parts of iron carbonyl was refluxed at 125–155° C. for 14 hours. Upon cooling, dicyclopentadienyl tetracarbonyl diiron precipitated and was filtered off. After recrystallization from methanol, 142 parts of product was obtained (75 percent).

To 595 parts of powdered 6 percent sodium amalgam in tetrahydrofuran was slowly added 110 parts dicyclopentadienyl tetracarbonyl in tetrahydrofuran. After stirring the mixture at room temperature for 24 hours, 220 parts methyl iodide were slowly added and the mixture refluxed for 3 hours. The resulting solution was filtered, the solvent evaporated under vacuum and the product sublimed at 55° C. A yield of 47 parts cyclopentadienyl methyl dicarbonyl iron (39 percent) was obtained as a stable, volatile, fuel-soluble material melting at 82° C.

*Analysis.*—Calc'd. for $C_5H_5FeO_2$: Fe, 29.1. Found: Fe, 29.6.

Having fully described the novel compositions of the present invention, modes and methods for their employment, we do not intend that our invention be limited except within the spirit and scope of the appended claims.

We claim:

1. A liquid hydrocarbon fuel of the gasoline boiling range for spark ignition internal combustion engines containing from about 0.5 to about 6.34 grams of lead per gallon as an organo-lead antiknock agent and from about 0.005 to about 1 gram of nickel per gallon as a cyclopentadienyl nickel coordination compound wherein the nickel achieves the electron configuration of the next higher rare gas solely by coordination with (1) a cyclopentadienyl hydrocarbon group of 5 to 13 carbon atoms and (2) at least one electron donor group selected from the class consisting of radicals and molecular species which contain labile electrons.

2. The gasoline composition of claim 1 wherein said cyclopentadienyl nickel coordination compound is a cyclopentadienyl nickel nitrosyl.

3. The gasoline composition of claim 1 wherein said organolead antiknock agent is tetraethyllead and said cyclopentadienyl nickel coordination compound is cyclopentadienyl nickel nitrosyl.

4. A liquid hydrocarbon fuel of the gasoline boiling range for spark ignition internal combustion engines containing from about 1.5 to about 4.3 grams of lead per gallon as an alkyllead antiknock agent and from about 0.01 to about 0.5 gram of nickel per gallon on a cyclopentadienyl nickel nitrosyl wherein the cyclopentadienyl group is a cyclopentadienyl hydrocarbon group of 5 to 13 carbon atoms.

5. The gasoline composition of claim 4 wherein said alkyllead antiknock agent is tetraethyllead and said nitrosyl is cyclopentadienyl nickel nitrosyl.

6. An antiknock fluid composition particularly adapted for addition to hydrocarbon fuels of the gasoline boiling range, said fluid consisting essentially of an organolead antiknock agent, an organic halide scavenger therefor and a cyclopentadienyl nickel coordination compound wherein the nickel achieves the electron configuration of the next higher rare gas solely by coordination with (1) a cyclopentadienyl hydrocarbon group of 5 to 13 carbon atoms and (2) at least one electron donor group selected from the class consisting of radicals and molecular species which contain labile electrons, said cyclopentadienyl nickel coordination compound being present in said fluid in amount such that for each gram of lead present there is from about 0.0008 to about 2 grams of nickel.

7. The gasoline composition of claim 4 wherein said alkyllead antiknock agent is tetramethyllead.

8. The antiknock fluid composition of claim 6 wherein said cyclopentadienyl nickel coordination compound is a cyclopentadienyl nickel nitrosyl.

9. The antiknock fluid composition of claim 6 wherein said organolead antiknock agent is tetraethyllead and said cyclopentadienyl nickel coordination compound is cyclopentadienyl nickel nitrosyl.

References Cited in the file of this patent

UNITED STATES PATENTS

| | | |
|---|---|---|
| 2,086,775 | Lyons et al. | July 13, 1937 |
| 2,150,349 | Van Peski et al. | Mar. 14, 1939 |
| 2,235,466 | Van Peski et al. | Mar. 18, 1941 |
| 2,375,236 | Miller | May 8, 1945 |
| 2,409,167 | Veltman | Oct. 8, 1946 |
| 2,680,758 | Thomas | June 8, 1954 |
| 2,810,736 | Catlin et al. | Oct. 22, 1957 |
| 2,810,737 | Haven | Oct. 22, 1957 |
| 2,831,880 | Benkeser | Apr. 22, 1958 |
| 2,835,686 | Graham | May 20, 1958 |
| 2,849,470 | Benson | Aug. 26, 1958 |
| 2,849,471 | Thomas | Aug. 26, 1958 |